(12) United States Patent
Watanabe et al.

(10) Patent No.: US 7,392,618 B2
(45) Date of Patent: Jul. 1, 2008

(54) DOOR FOR VEHICLE HAVING A DOOR GLASS WITH PROJECTING PORTIONS

(75) Inventors: Hakurei Watanabe, Wako (JP); Jiro Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 11/048,982

(22) Filed: Feb. 2, 2005

(65) Prior Publication Data
US 2005/0166460 A1 Aug. 4, 2005

(30) Foreign Application Priority Data
Feb. 4, 2004 (JP) .............................. 2004-028511

(51) Int. Cl.
E05D 15/16 (2006.01)
(52) U.S. Cl. .............................. 49/428; 49/440; 49/349; 49/352; 49/374
(58) Field of Classification Search ............... 49/348, 49/349, 351, 352, 374, 414, 428, 440, 441, 49/442
See application file for complete search history.

(56) References Cited

U.S. PATENT DOCUMENTS 2,025,272 A * 12/1935 Crowell ................. 454/128
5,050,348 A * 9/1991 Kane et al. .............. 49/351
5,086,589 A * 2/1992 dibenedetto .............. 49/502
5,243,785 A * 9/1993 Nieboer et al. ............ 49/375
6,018,913 A * 2/2000 Lin ...................... 49/414
6,502,365 B1 * 1/2003 Legrand et al. .......... 52/786.11

FOREIGN PATENT DOCUMENTS

| FR | 2 339 048 | 8/1977 |
| GB | 438 766 A | 11/1935 |
| JP | 61-30517 | 2/1986 |
| JP | 11-348556 | 12/1999 |

* cited by examiner

Primary Examiner—Gregory J Strimbu
(74) Attorney, Agent, or Firm—Rankin, Hill & Clark LLP

(57) ABSTRACT

A door for a vehicle includes a run channel and a door glass slidable up and down along the run channel. A rear edge of the door glass, which is in sliding contact with a rear channel of the run channel, has respective projecting portions at upper and lower end portions thereof. The projecting portions project more than a middle portion of the rear edge positioned centrally in an up-and-down direction of the rear edge. The rear edge is deeply received in a groove formed in the rear channel not throughout the length thereof but at the projecting portions so as to reduce a slide resistance which the door glass undergoes when sliding relative to the run channel.

6 Claims, 9 Drawing Sheets

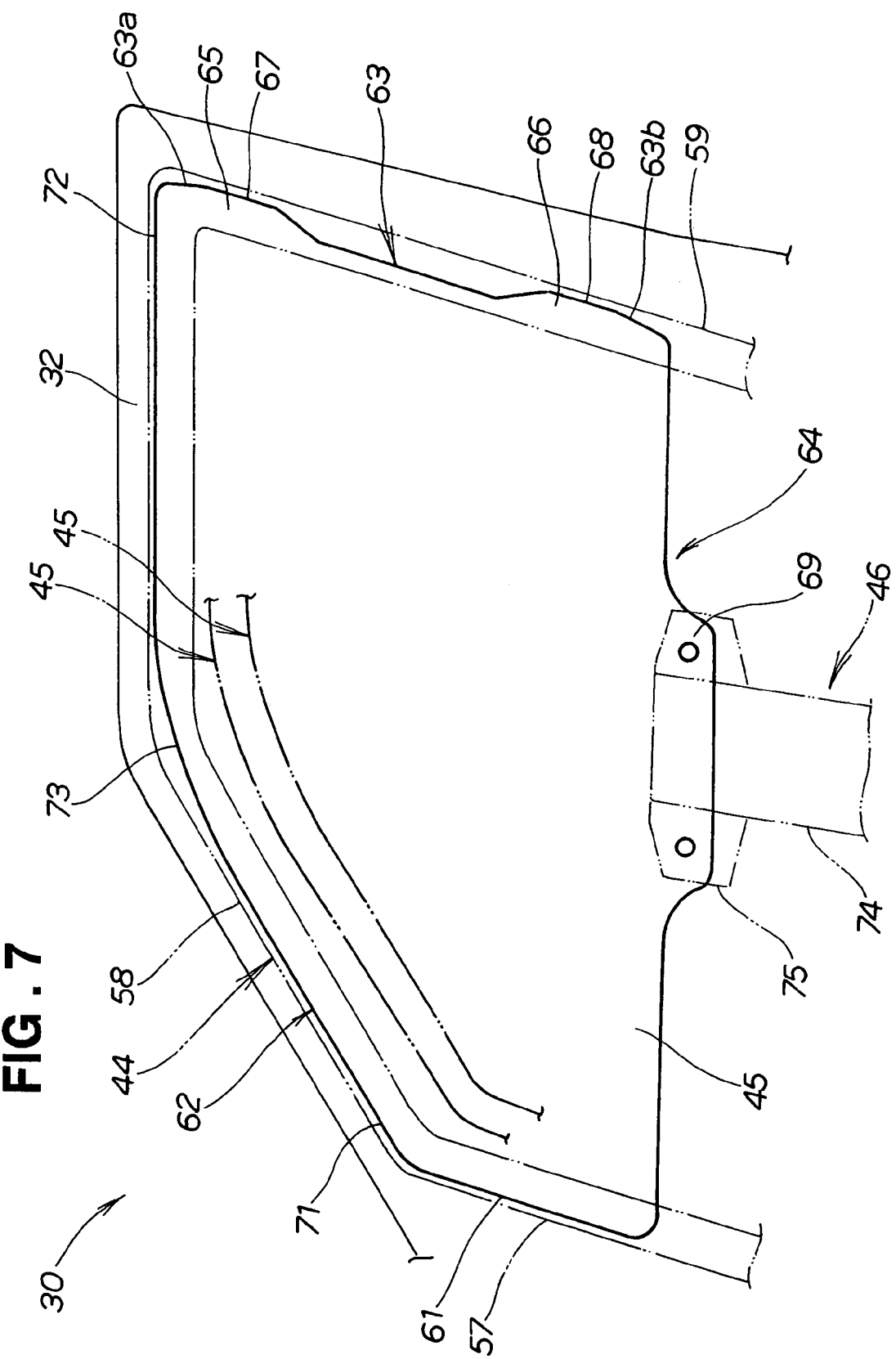

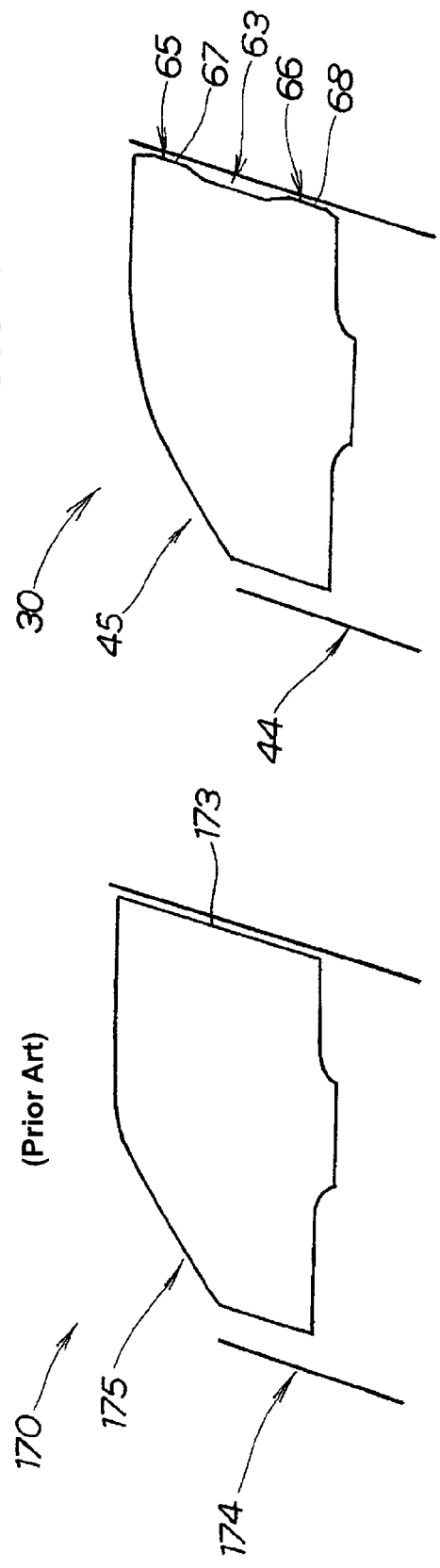
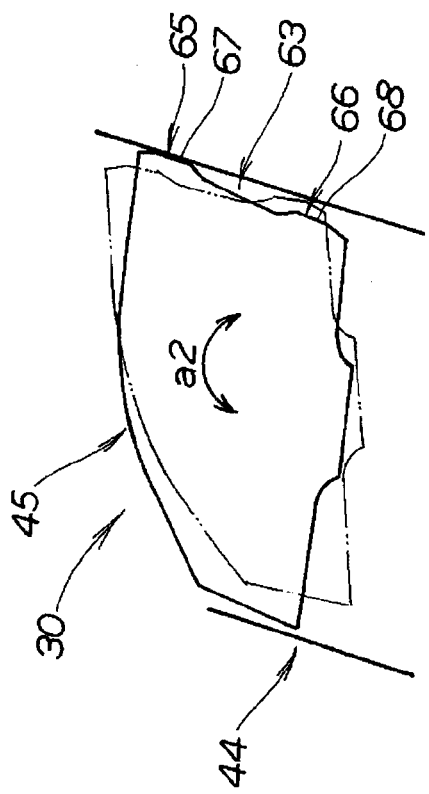
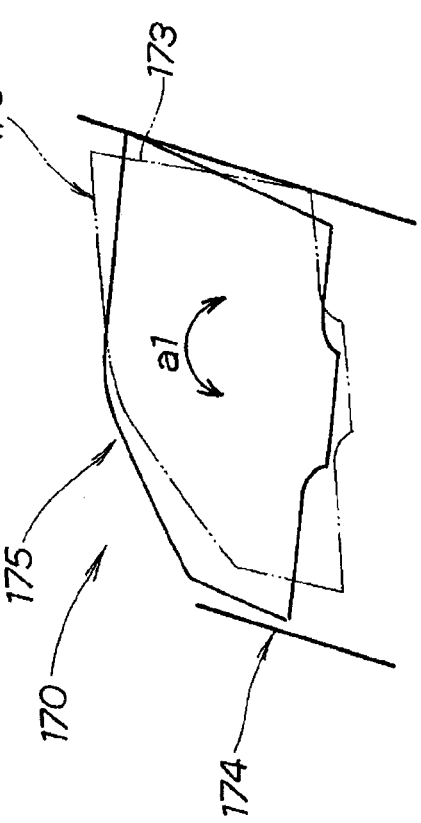
FIG. 8A (Prior Art)
FIG. 8B
FIG. 8C (Prior Art)
FIG. 8D

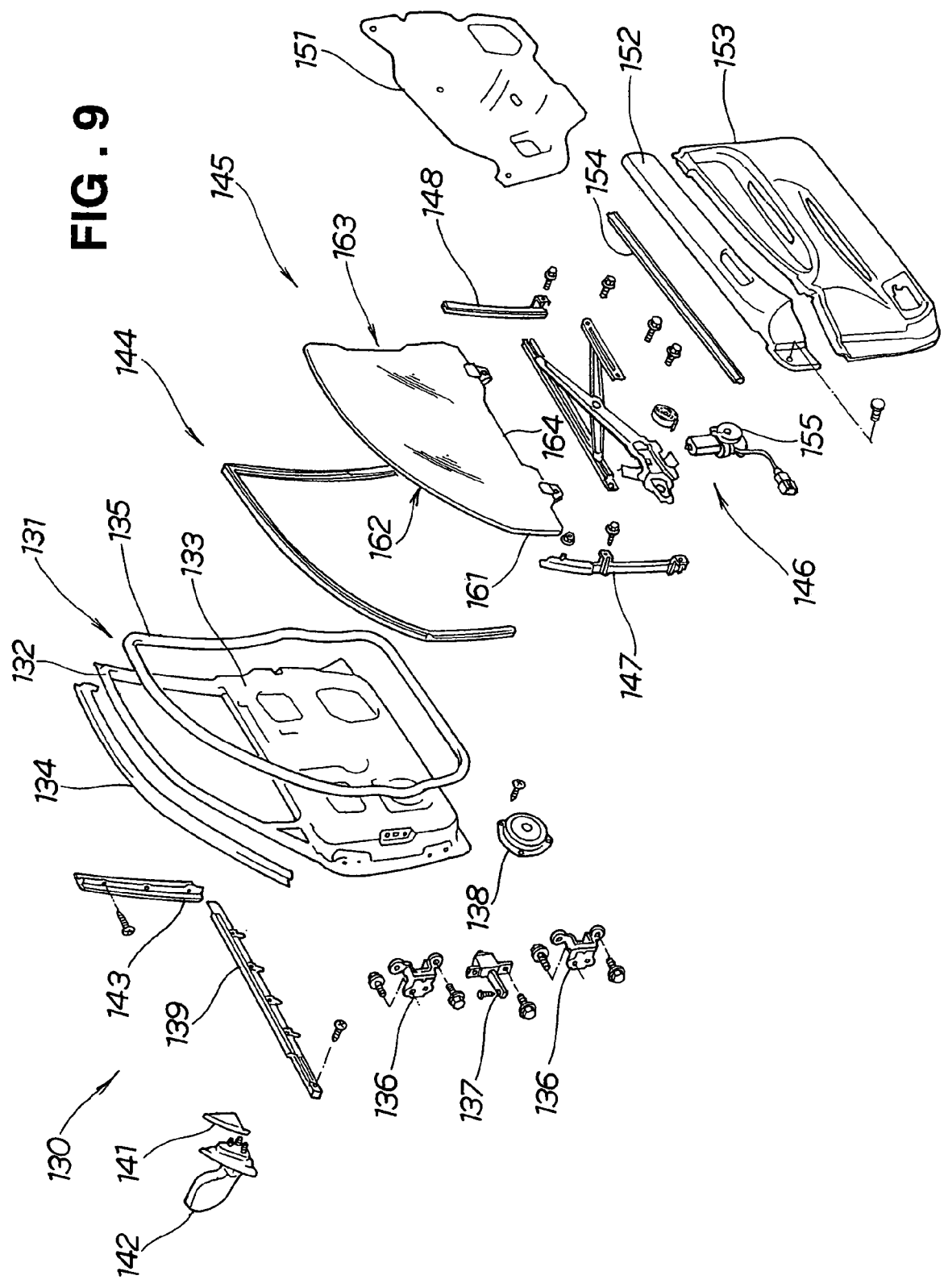

DOOR FOR VEHICLE HAVING A DOOR GLASS WITH PROJECTING PORTIONS

FIELD OF THE INVENTION

The present invention relates to a door for a vehicle including a run channel and a door glass slidable up and down along the run channel.

BACKGROUND OF THE INVENTION

Doors for vehicles including run channels, door glasses movable up and down along the run channels, and window regulators provided at lower parts of the door glasses are put in practical use.

As for the above door, no serious problem is presented in its practical use so long as the door glass of the door has a front edge, an upper edge and a rear edge formed to conform in configuration to three sides, that is, a front channel, an upper channel and a rear channel of the run channel, respectively.

The door as discussed above is disclosed in, for example, JP-A-11-348556. The disclosed door will be described with reference to FIG. 10 hereof.

A door 200 for a vehicle shown in FIG. 10 includes a door body 201, a run channel 202 provided in the door body 201 and a door glass 203 movable up and down along the run channel 202. The door glass 203 has a lower part at which a window regulator 204 is positioned. The window regulator 204 is attached to the door body 201. The door glass 203 has a front edge 211, an upper edge 212 and a rear edge 213 conforming in configuration to a front channel 205, an upper channel 206 and a rear channel 207 of the run channel 202, respectively.

The front edge 211 of the door glass 203 slides in its entirety relative to the front channel 205. The rear edge 213 of the door glass 203 slides in its entirety relative to the rear channel 207. Thus, the door glass 203 is undesirably subjected to an increased resistance when sliding up and down along the run channel 202.

Additionally, because the upper edge 212 of the door glass 203 has its configuration conforming to that of the upper channel 206 of the run channel 202, the upper edge 212 is in its entirety fitted to the upper channel 206 in one stroke when the door glass 203 is fully closed. As a result, the door glass 203 can not be fully closed without producing a loud sound.

Thus, there has been a demand for a vehicular door including a door glass which can undergo a reduced resistance when moving up and down and which can be fully closed without producing a loud sound.

SUMMARY OF THE INVENTION

According to a first aspect of the present invention, there is provided a door for a vehicle, comprising: a door body; a run channel provided in the door body; a door glass slidable up and down along a front channel and a rear channel of the run channel; and wherein a front edge of the door glass in sliding contact with the front channel and/or a rear edge of the door glass in sliding contact with the rear channel has projecting portions at upper and lower end portions thereof, the projecting portions projecting more than a middle portion of the front edge and/or the rear edge positioned centrally in an up-and-down direction of the front edge and/or the rear edge.

By virtue of the upper and lower projecting portions thus arranged, the front edge and/or the rear edge of the door glass does not abut on the run channel throughout the length thereof. Thus, the door glass can undergo a reduced resistance when sliding up and down. Additionally, any member (e.g., means for raising and lowering the door glass, generally so-called a window regulator) for driving the door glass can be rendered small in size. Therefore, it becomes possible to reduce a cost of the door for the vehicle.

In a preferred form of the present invention, peak portions of the upper and lower projecting portions extend towards the middle portion from positions spaced from top and bottom ends of the front edge and/or the rear edge of the door glass. More particularly, for example, beveled portions extend from the top and bottom ends of the front edge and/or the rear edge of the door glass to the positions spaced from the top and bottom ends of the front edge and/or the rear edge of the door glass. Thus, the door glass can smoothly slide up and down along the run channel without being caught by the run channel even if the door glass is inclined during the slide movement.

Desirably, the peak portions of the upper and lower projecting portions each extend in a straight line along the front channel and/or the rear channel. Therefore, the door glass can stably slide relative to the run channel without producing a slide sound.

According to a second aspect of the present invention, there is provided a door for a vehicle, comprising: a door body; a run channel provided in the door body; a door glass slidable up and down along a front channel and a rear channel of the run channel; and wherein an upper edge of the door glass is formed such that, when the upper edge abuts on an upper channel of the run channel, an upper front end and an upper rear end of the upper edge abut on the upper channel prior to an upper middle portion of the upper edge.

More specifically, for example, in one embodiment, the upper channel of the run channel has an optionally selected radius of curvature, and the upper edge of the door glass has a radius of curvature greater than that of the upper channel. Accordingly, the upper front end and the upper rear end can abut on the upper channel of the run channel prior to the upper middle portion. With this arrangement, it becomes possible to prevent a loud sound from being produced when the door glass is fully closed. Additionally, because the upper front end and the upper rear end abut on the upper channel prior to the upper middle portion, the door glass can be strongly pressed against the run channel to thereby provide a silent passenger compartment.

BRIEF DESCRIPTION OF THE DRAWINGS

Certain preferred embodiments of the present invention will hereinafter be described in detail, by way of example only, with reference to the accompanying drawings, in which:

FIG. 7 is a view showing a configuration of a door glass of the door shown in FIG. 3;

FIG. 8A shows a side view of the door glass in the prior art with the door glass in a normal position. FIG. 8B shows a side view of the door glass of the present invention in a normal position. FIG. 8C shows a side view of the door glass of the prior art in an inclined position. FIG. 8D shows a side view of the door glass of the present invention in an inclined position;

FIG. 9 is an exploded perspective view of a door for a vehicle according to another embodiment of the present invention.

DETAILED DESCRIPTION OF THE PREFERRED EMBODIMENTS

Figure 1:
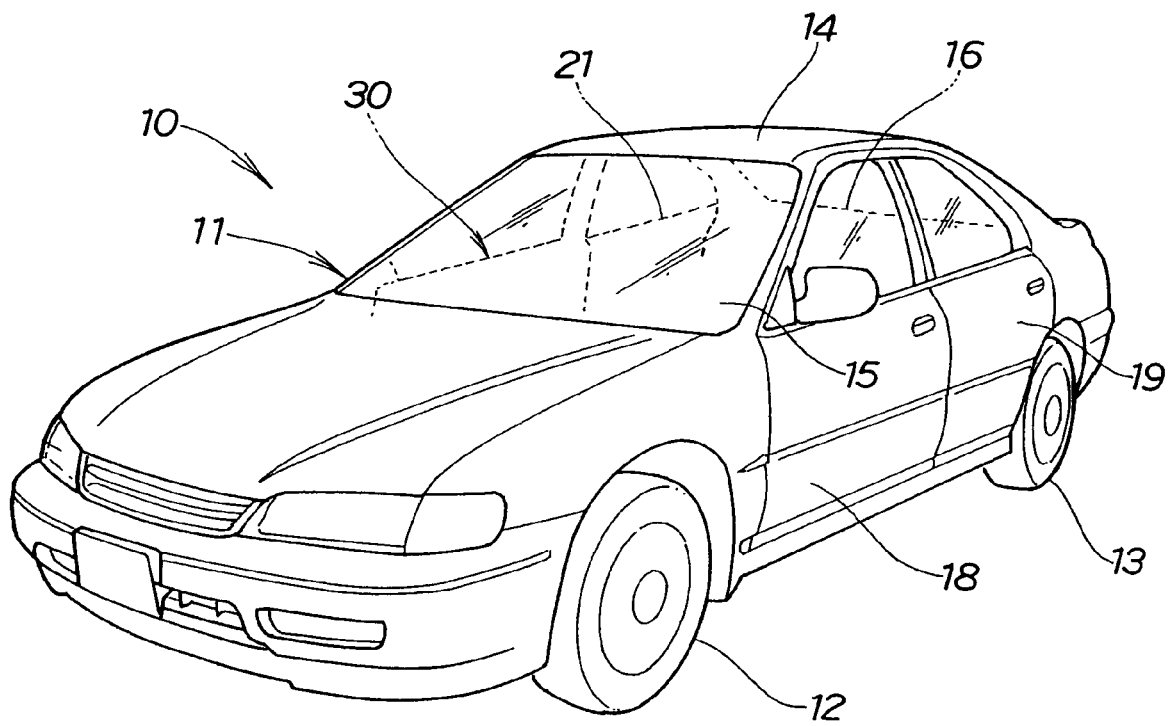
FIG. 1 is a perspective view of a vehicle employing a door according to one embodiment of the present invention.

In FIG. 1, reference numerals 10, 11, 12, 13, 14,15,16,18, 19, 21, 30 denote a vehicle, a vehicle body, a front wheel, a rear wheel, a roof, a windshield, a rear window, a left front door, a left rear door, a right rear door and a right front door. The right front door 30 will be hereinafter referred to as "a door 30 for a vehicle 10" according to one embodiment of the present invention. The door 30 for the vehicle 10 will be discussed in detail below.

Figure 2:
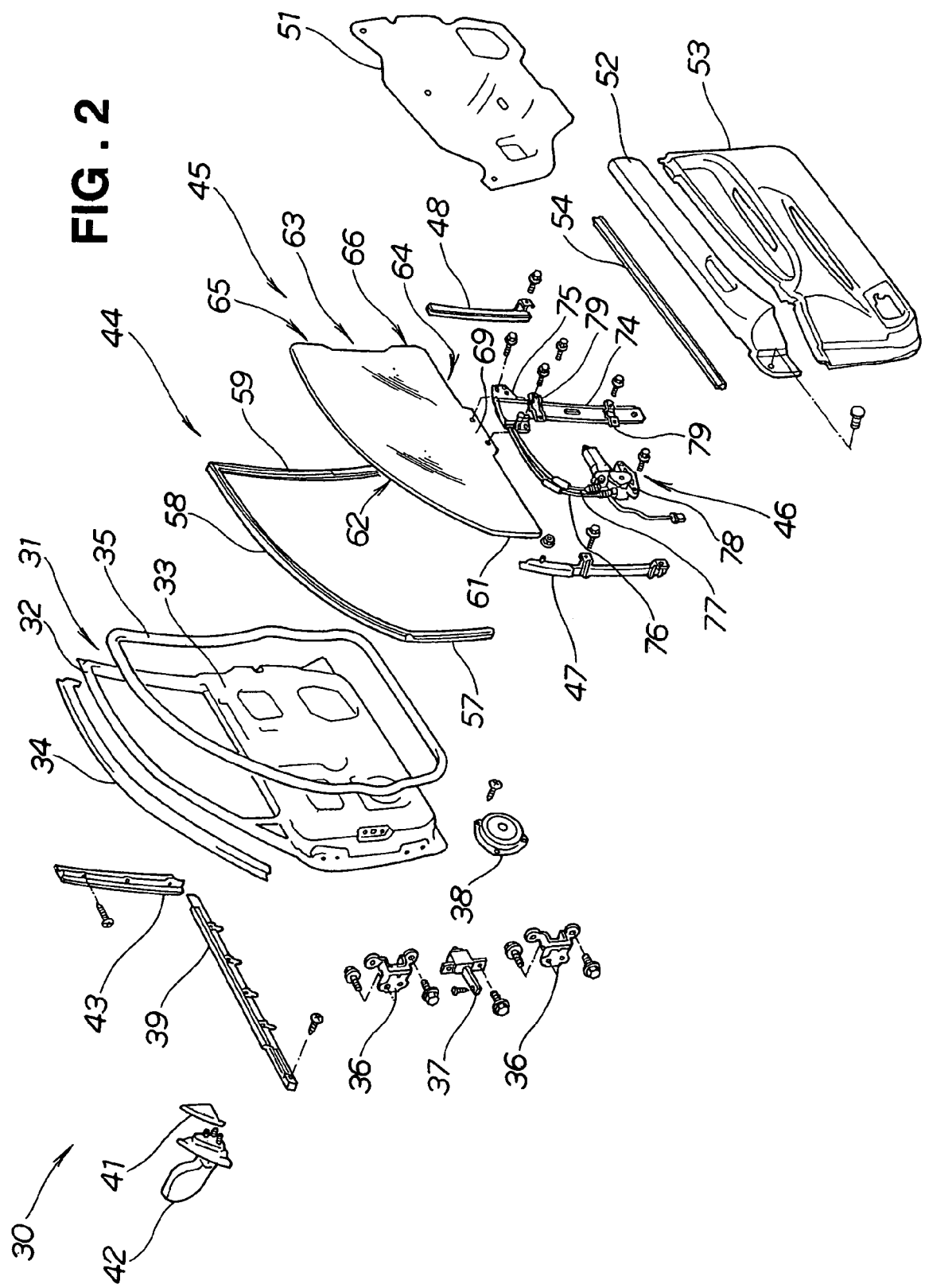
FIG. 2 is an exploded perspective view of the door shown in FIG. 1.

As shown in FIG. 2, the door 30 for the vehicle 10 includes a door body 31, a run channel 44 to be attached to the door body 31 from inside the same, and a door glass 45 in sliding contact with the run channel 44.

The door body 31 has a window sash 32 and a door lower part 33 located below the window sash 32. The window sash 32 has its outside to which an outer weatherstrip 34 is attached. The door body 31 has its inner periphery along which an inner weatherstrip 35 is attached.

Upper and lower hinges 36, 36 are interposed between the vehicle body 11 (see FIG. 1) and the door body 31 for allowing the door body 31 to move between an opened position and a closed position. A door checker 37 is disposed between the upper hinge 36 and the lower hinge 36 and attached to the door body 31.

A speaker 38 is attached to the inside of the door body 31.

An outer moulding 39 is attached to the outside of the door body 31.

A door mirror 42 is attached via a door mirror garnish 41 to the outside of the door body 31.

A sash garnish 43 is attached to the outside of the window sash 32.

The run channel 44 is provided in the door body 31. The door glass 45 is slidable along the run channel 44.

Means 46 for raising and lowering the door glass 45 is attached to the door body 31. This means 46 will be referred to as "window regulator 46" hereinbelow.

The run channel 44 has its front part supported by a front sash 47 while the run channel 44 has its rear part supported by a center sash 48.

The door lower part 33 of the door body 31 has its inside covered by an upper lining 52 and a lining 53 through a hole seal 51. The upper lining 52 is covered by an inner moulding 54.

Figure 3:
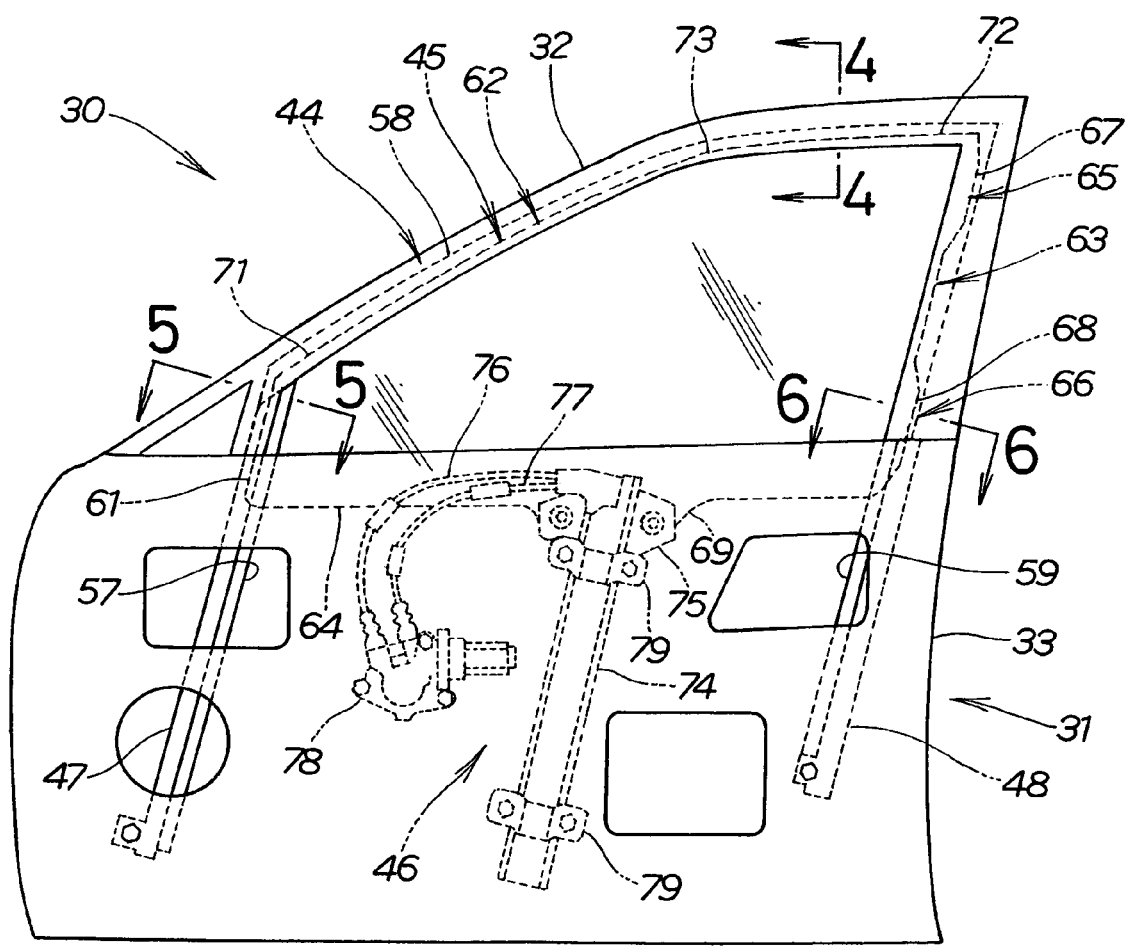
FIG. 3 is a side elevation view of the right front door of FIG. 2, as viewed from a passenger compartment side of the vehicle.

FIG. 3 shows the door 30 with the hole seal 51, the upper lining 52 and the lining 53 shown in FIG. 2 removed.

The run channel 44 shown in FIG. 3 has a front channel 57 which a front edge 61 of the door glass 45 slidably contacts, an upper channel 58 on which an upper edge 62 of the door glass 45 abuts, and a rear channel 59 which a rear edge 63 of the door glass 45 slidably contacts.

The door glass 45 has the four edges consisting of the front edge 61, the upper edge 62, the rear edge 63 and a lower edge 64. The rear edge 63 has upper and lower projecting portions 65, 66 formed at upper and lower portions thereof, respectively, and projecting towards a rear part of the vehicle body 11. The upper projecting portion 65 and the lower projecting portion 66 are spaced from each other in an up-and-down direction. The upper and lower projecting portions 65, 66 are each small in length. Thus, the rear edge 63 of the door glass 45 is easily worked with increased precision in a short time, and the management for the working precision is easy to perform. Because the upper and lower projecting portions 65, 66 of the rear edge 63 of the door glass 45 slidably contact the rear channel 59 of the run channel 44, the door glass 45 can undergo a reduced resistance when sliding up and down.

The upper projecting portion 65 has a peak portion 67 extending in a straight line along the rear channel 59 of the run channel 44 towards a middle portion of the rear edge 63 positioned centrally in an up-and-down direction of the rear edge 63. The rear edge 63 is beveled at a top end portion thereof, such that the top end portion of the rear edge 63 does project. Similarly, the lower projecting portion 66 has a peak portion 68 extending in a straight line along the rear channel 59 of the run channel 44 towards the middle portion of the rear edge 63 positioned centrally in the up-and-down direction of the rear edge 63. The rear edge 63 is beveled at a bottom end portion thereof, such that the bottom end of the rear edge 63 does not project.

The upper edge 62 of the door glass 45 is curved at a greater radius of curvature than the upper channel 58 curved, as will be set forth later.

The upper edge 62 of the door glass 45 has an upper front end 71, an upper rear end 72 and a middle portion 73. The lower edge 64 has an attachment portion 69 projecting downwardly for attachment of the window regulator 46 thereto.

The window regulator 46 includes a rail 74, a sliding member 75 slidably attached to the rail 74, forward and reverse cables 76, 77 connected to the sliding member 75 and a drive unit 78 for driving the cables 76, 77. The rail 74 is held to the door lower part 33 of the door body 31 by brackets 79, 79.

The front sash 47 supports the front channel 57 while the center sash 48 supports the rear channel 59.

Figure 4:
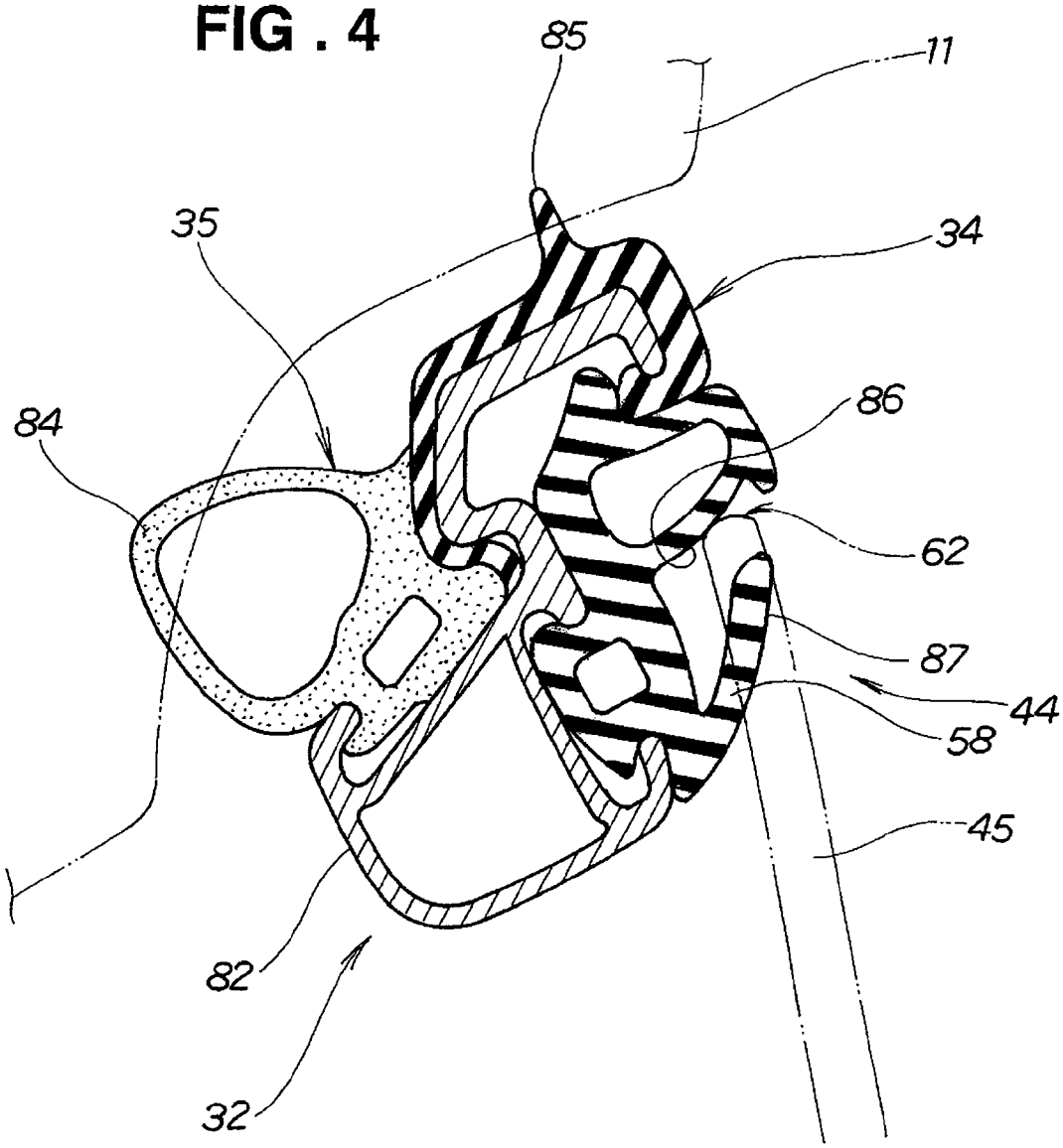
FIG. 4 is a cross-sectional view taken along line 4-4 of FIG. 3.

FIG. 4 shows in cross-section an upper frame 82 of the window sash 32, the outer weatherstrip 34, the inner weatherstrip 35 and the upper channel 58 of the run channel 44.

The inner weatherstrip 35 is attached to the upper frame 82 of the window sash 32 on a passenger compartment side of the vehicle 10 while the outer weatherstrip 34 is attached to the upper frame 82 of the window sash 32 on the outside of the vehicle 10. The inner weatherstrip 35 has a hollow portion 84 resiliently abutting on the vehicle body 11. The outer weatherstrip 34 has a projecting piece 85 resiliently abutting on the vehicle body 11. Thus, the two weatherstrips 34, 35 are in sealing engagement with the vehicle body 11 to prevent wind and rain from entering into a gap between the vehicle body 11 and the upper frame 82 of the window sash 32.

The upper channel 58 of the run channel 44 is attached to the upper frame 82 of the window sash 32 on the outside of the vehicle 11. The upper channel 58 has an upper projecting piece 87 resiliently abutting on an inner surface of the door glass 45. The upper edge 62 of the door glass 45 abuts on an upper hollow portion 86 of the upper channel 58 of the run channel 44. Thus, the upper channel 58 of the run channel 44 is in sealing engagement with the door glass 45.

Figure 5:
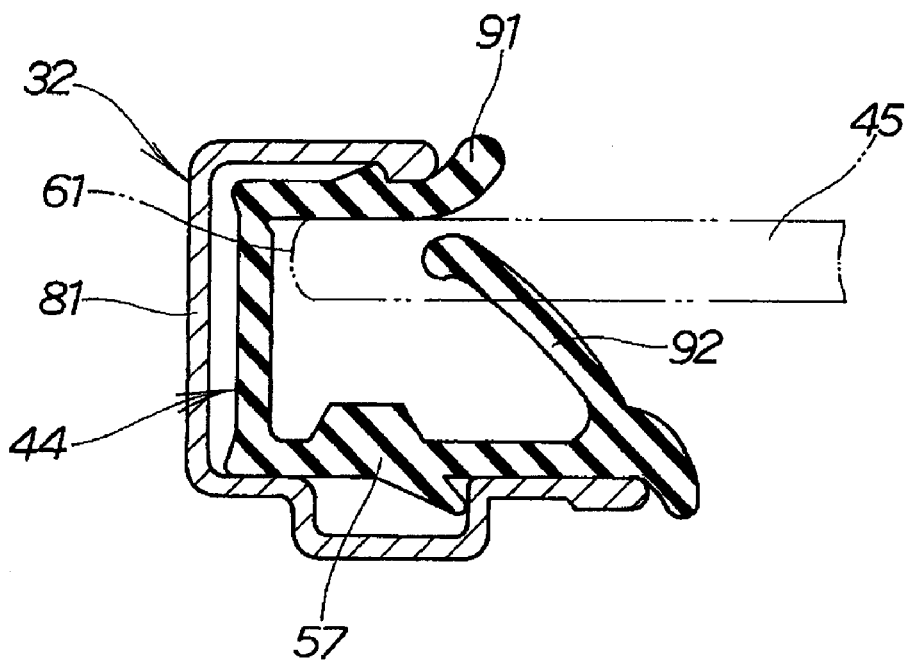
FIG. 5 is a cross-sectional view taken along line 5-5 of FIG. 3.

FIG. 5 shows in cross-section a front frame 81 of the window sash 32 and the front channel 57 of the run channel 44.

The front channel 57 is received in an inner space defined by the front frame 81 of U-shaped cross-section. The front channel 57 has a front outer piece 91 resiliently abutting on an outer surface of the door glass 45. The front channel 57 has a front inner piece 92 flexed in abutment on the door glass 45. Thus, the front channel 57 seals a gap between the door glass (window pane) 45 and the window sash 32.

Figure 6:
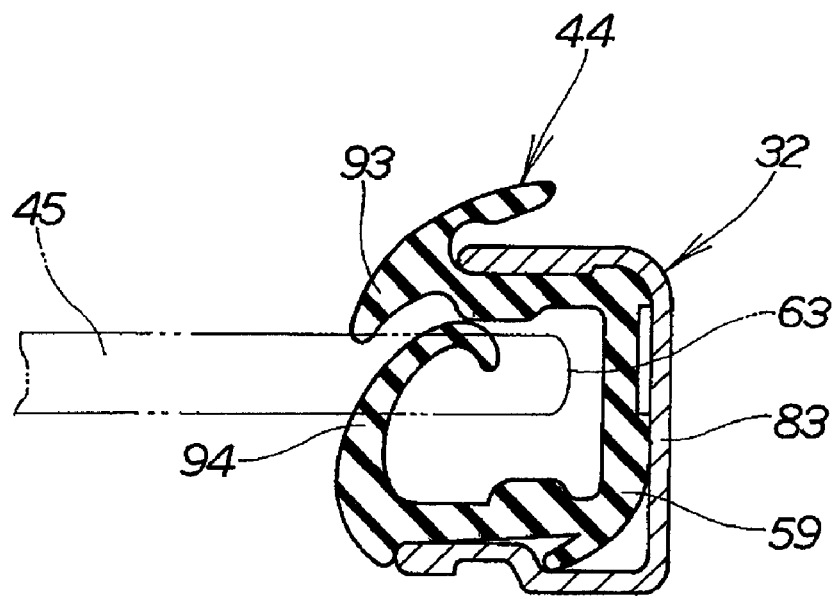
FIG. 6 is a cross-sectional view taken along line 6-6 of FIG. 3.
Figure 10:
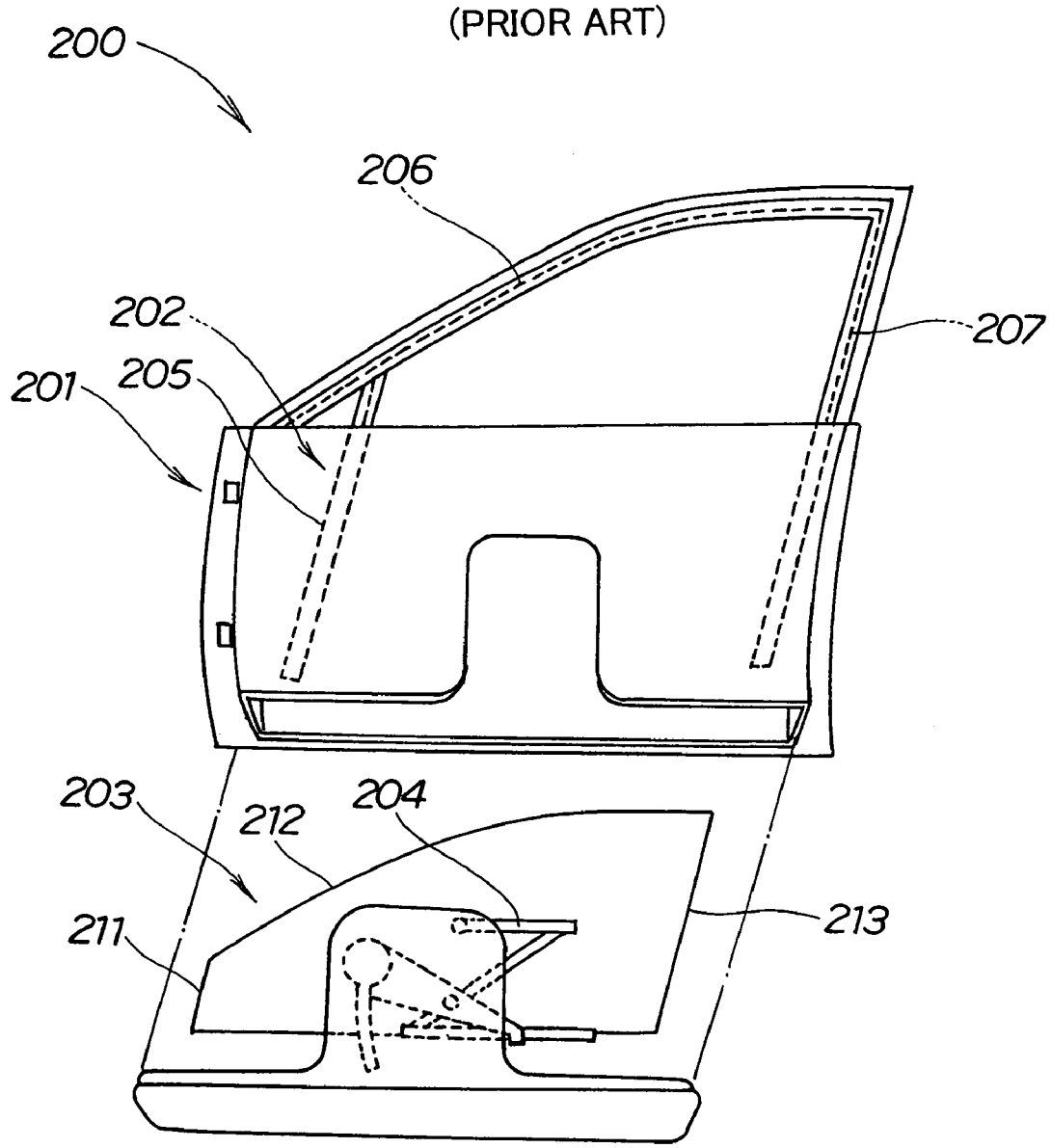
FIG. 10 shows a conventional door for a vehicle.

FIG. 6 shows in cross-section a rear frame 83 of the window sash 32 and the rear channel 59 of the run channel 44.

The rear channel 59 is received in an inner space defined by the rear frame 83 of U-shaped cross-section. The rear channel 59 has a rear outer piece 93 resiliently abutting on the outer surface of the door glass 45. The rear channel 59 has a front inner piece 94 flexed in abutment on the door glass 45. Thus, the rear channel 59 seals a gap between the door glass (window pane) 45 and the window sash 32.

FIG. 7 shows the door 30 for the vehicle 10, especially, the door glass 45 in detail. The door glass 45 slides up and down along the front and rear channels 57, 59 of the run channel 44. By abutting on the upper channel 58 of the run channel 44, the door glass 45 fully closes a window defined by the window sash 32. The rear edge 63 of the door glass 45 in sliding contact with the rear channel 59 of the run channel 44 has the upper projecting portion 65 and the lower projecting portion 66 formed on a side of an upper end portion of the rear edge 63 and on a side of a lower end portion of the rear edge 63, respectively. The upper projecting portion 65 and the lower projecting portion 66 more project towards the rear part of the vehicle body 11 than the middle portion of the rear edge 63.

That is, only the upper and lower projecting portions 65, 66 of the rear edge 63 substantially slidably contact the rear channel 59 of the run channel 44. With this arrangement, a resistance which the door glass 45 undergoes when sliding up and down can be reduced. Accordingly, a device or mechanism (e.g., the window regulator 46) for driving the door glass 45 can be downsized for reducing a cost of the door 30.

The peak portion 67 of the upper projecting portion 65 is connected through a beveled portion 63a to a top end of the rear edge 63 of the door glass 45. The peak portion 68 of the lower projecting portion 66 is connected through a beveled portion 63b to a bottom end of the rear edge 63 of the door glass 45. Namely, the upper projecting portion 65 has the upper beveled portion 63a and the peak portion 67 while the lower projecting portion 66 has the lower beveled portion 63b and the peak portion 68. The beveled portion 63a of the upper projecting portion 65 is an escape portion for enabling the top end of the rear edge 63 to avoid being caught by the rear channel 59 of the run channel 44 when the door glass 45 is inclined during the upward or downward slide movement. Similarly, the beveled portion 63b of the lower projecting portion 66 is an escape portion for enabling the bottom end of the rear edge 63 to avoid being caught by the rear channel 59 of the run channel 44 when the door glass 45 is inclined during the upward or downward slide movement. Accordingly, even if the door glass 45 is inclined during the upward or downward slide movement, the door glass 45 can avoid being caught by the run channel 44 without contact resistance between the rear edge 63 of the door glass 45 and the rear channel 59 of the run channel 44 increasing. Therefore, the door glass 45 can smoothly slide up and down while undergoing a small resistance.

Because the peak portions 67, 68 of the upper and lower projecting portions 65, 66 of the rear edge 63 of the door glass 45 each extend in a straight line along the rear channel 59 of the run channel 44, as discussed above, the door glass 45 provides a stable, smooth slide movement with respect to the rear channel 59 while preventing a slide sound from being produced between the door glass 45 and the rear channel 59.

The upper channel 58 of the run channel 44 is curved at an optionally selected radius of curvature. The middle portion 73 of the upper edge 62 of the door glass 45 is curved at a greater radius of curvature than the upper channel 58 of the run channel 44 such that the upper front end 71 and the upper rear end 72 abut on the upper channel 58 prior to the middle portion 73 when the door glass 45 is raised and fully closes the window defined by the window sash 32.

Because the upper front end 71 and the upper rear end 72 of the upper edge 62 of the door glass 45 abut on the upper channel 58 of the run channel 44 prior to the middle portion 73, namely, because the upper edge 62 does not abut on the upper channel 58 in its entirety in one stroke, loud sound can be prevented from being produced when the door glass 45 fully closes the window defined by the window sash 32. Also, because the two portions, that is, the upper front end 71 and the upper rear end 72 abut on the upper channel 58 prior to the upper middle portion 73, the door glass 45 can be strongly pressed against the run channel 44. With this arrangement, quietness can be made within the passenger compartment of the vehicle 10.

The door glass 45 of the door 30 according to the present invention will be discussed in comparison with a door glass in a comparative example. FIG. 8A and FIG. 8B illustrate the door glasses in the comparative example and in the one embodiment of the present invention and the door glasses of FIG. 8A and FIG. 8B are both in normal states where they are not inclined. FIG. 8C and FIG. 8D illustrate the door glasses in the comparative example and in the one embodiment of the present invention and the door glasses of FIG. 8C and FIG. 8D are both in inclined states.

A vehicular door 170 in the comparative example of FIG. 8A includes a door glass 175 slidable up and down along a run channel 174. The door glass 175 has a flat rear edge 173 (extending in a straight line). That is, the rear edge 173 of the door glass 175 abuts on the run channel 174 throughout the length thereof. Thus, when the door glass 175 slides up and down along the run channel 174, a large slide resistance is produced between the door glass 175 and the run channel 174.

In contrast, the rear edge 63 of the door glass 45 in the embodiment of the present invention shown in FIG. 8B does not abut on the run channel 44 in its entirety because the rear edge 63 has the upper and lower projecting portions 65, 66. With this arrangement, when the door glass 45 slides up and down along the run channel 44, a smaller slide resistance is produced between the door glass 45 and the run channel 44 than between the door glass 175 and the run channel 174. Thus, the door glass 45 can be smoothly raised and lowered along the run channel 44.

When the door glass 175 is inclined as indicated by an arrow a1, as shown in FIG. 8C, during the upward or downward slide movement, the rear edge 173 (especially, a corner portion) of the door glass 175 shown by a double dot-and-dash line strongly hits the run channel 174 with the result that the door glass 175 is caught by the run channel 174.

In the door glass 45 of the embodiment of the present invention shown in FIG. 8D, the peak portion 67 of the upper projecting portion 65 extends towards the middle portion of the rear edge 63 from a position spaced from the top end of the rear edge 63 of the door glass 45. Similarly, the peak portion 68 of the lower projecting portion 66 extends towards the middle portion of the rear edge 63 from a position spaced from the bottom end of the rear edge 63 of the door glass 45. In other words, the peak portion 67 is formed by cutting the rear edge 63 by a predetermined distance from the top end of the rear edge 63 while the peak portion 68 is formed by cutting the rear edge 63 by a predetermined distance from the bottom end of the rear edge 63. With this arrangement, even if the door glass 45 is inclined as indicated by an arrow a2 of FIG. 8D during the upward or downward slide movement, the top or bottom end, especially, a top or bottom corner of the rear edge 63 can avoid being caught by the run channel 44.

This arrangement of the upper end lower projecting portions 65, 66 does not hinder the upward or downward slide movement of the door glass 45.

FIG. 9 shows a door 130 for a vehicle according to another embodiment of the present invention. Reference numerals 131, 132, 133, 134, 135, 136, 137, 138, 139, 141, 142, 143, 144, 145, 146, 147, 148, 151, 152, 153, 154, 155 denote a door body, a window sash of the door body 131, a door lower part of the door body 131, an outer weatherstrip, an inner weatherstrip, an upper or lower hinge, a door checker, a speaker, an outer moulding, a door mirror garnish, a door mirror, a sash garnish, a run channel, a door glass, a window regulator (means for raising and lowering the door glass 145), a front sash, a center sash, a hole seal, an upper lining, a lining, an inner moulding and a drive unit for the window regulator 146, respectively.

The window regulator 146 of the door 130 is an arm-type window regulator. The window regulator 146 supports the door glass 145 by holding two points of a lower edge 164 of the door glass 145, such that the door glass 145 can be inclined at a smaller angle when the door glass 145 slides up and down along the run channel 144.

The door glass 145 has a front edge 161, an upper edge 162 and a rear edge 163 identical in configuration to the front edge 61, the upper edge 62 and the rear edge 63 of the door glass 45 shown in FIG. 7, respectively.

The door for the vehicle according to the present invention can also be applicable to other vehicular doors than the right front door 30 which include a left front door, a left rear door and a right rear door each having a door glass slidable up and down along a run channel.

In the illustrated embodiments, the rear edge has the upper and lower projecting portions, however, the door glass of the door for the vehicle according to the present invention may have the upper and lower projecting portions at the front edge 61 or both of the front and rear edges thereof.

Although, in the illustrated embodiment, the door glass 45 includes the upper edge 62 formed to have a greater radius of curvature than the upper run channel 58 of the run channel 44, as shown in FIG. 7, so as to cause the upper front end 71 and the upper rear end 72 to abut on the upper channel 58 prior to the middle portion 73, the upper edge 62 of the door glass 45 may be formed to have an upper front end 71 and an upper rear end 72 projecting more than a middle portion 73 or to provide a recessed portion of the middle portion 73 to abut on the upper channel 58.

Obviously, various minor changes and modifications of the present invention are possible in the light of the above teaching. It is therefore to be understood that within the scope of the appended claims the invention may be practices otherwise than as specifically described.

What is claimed is:

1. A door for a vehicle, comprising:
    a door body;
    a run channel provided in the door body and having a front channel, an upper channel, and a rear channel; and
    a door glass slidable up and down along the front channel and the rear channel of the run channel, said door glass having four edges consisting of a front edge, an upper edge, a rear edge, and a lower edge, said door glass being formed from a unitary piece of glass comprising upper and lower door glass projecting portions formed as part of the unitary piece of glass at at least one of the front edge and the rear edge thereof, said door glass front edge being in sliding contact with the front channel, said door glass rear edge being in sliding contact with the rear channel,
    wherein said door glass projecting portions are formed at upper and lower end portions of said at least one of the front and rear edges of said door glass, and the upper and lower door glass projecting portions project outwardly from said at least one of the front edge and the rear edge more than a vertical middle portion of said at least one of the front edge and the rear edge, and
    wherein said upper edge of the door glass is curved at a greater radius of curvature than a radius of curvature of the upper channel, so as to cause an upper front end and an upper rear end of the upper edge to abut the upper channel prior to a middle portion of the upper edge formed between the upper front end and the upper rear end of the upper edge abutting the upper channel as said door glass is moved from an open position to a closed position.

2. The door for a vehicle according to claim 1, wherein said upper and lower door glass projecting portions have peak portions extending toward the middle portion from positions spaced from respective top and bottom ends of said at least one of the front edge and the rear edge of the door glass.

3. The door for a vehicle according to claim 2, wherein the peak portions of the upper and lower door glass projecting portions each extend straight along the a respective one of the front and rear channel, and include a linear portion which is generally parallel with the respective one of the front and rear channels.

4. The door for a vehicle according to claim 2, wherein said upper and lower door glass projecting portions each include at least one beveled portion extending from a respective one of the peak portions to said at least one of the front edge and the upper edge.

5. The door for a vehicle according to claim 1, wherein the door glass front edge is received within the front channel of the run channel, and the door glass rear edge is received within the rear channel of the run channel.

6. The door for a vehicle according to claim 1, wherein the upper and lower door glass projecting portions are slidably received within the run channel.

* * * * *